United States Patent Office 2,956,101
Patented Oct. 11, 1960

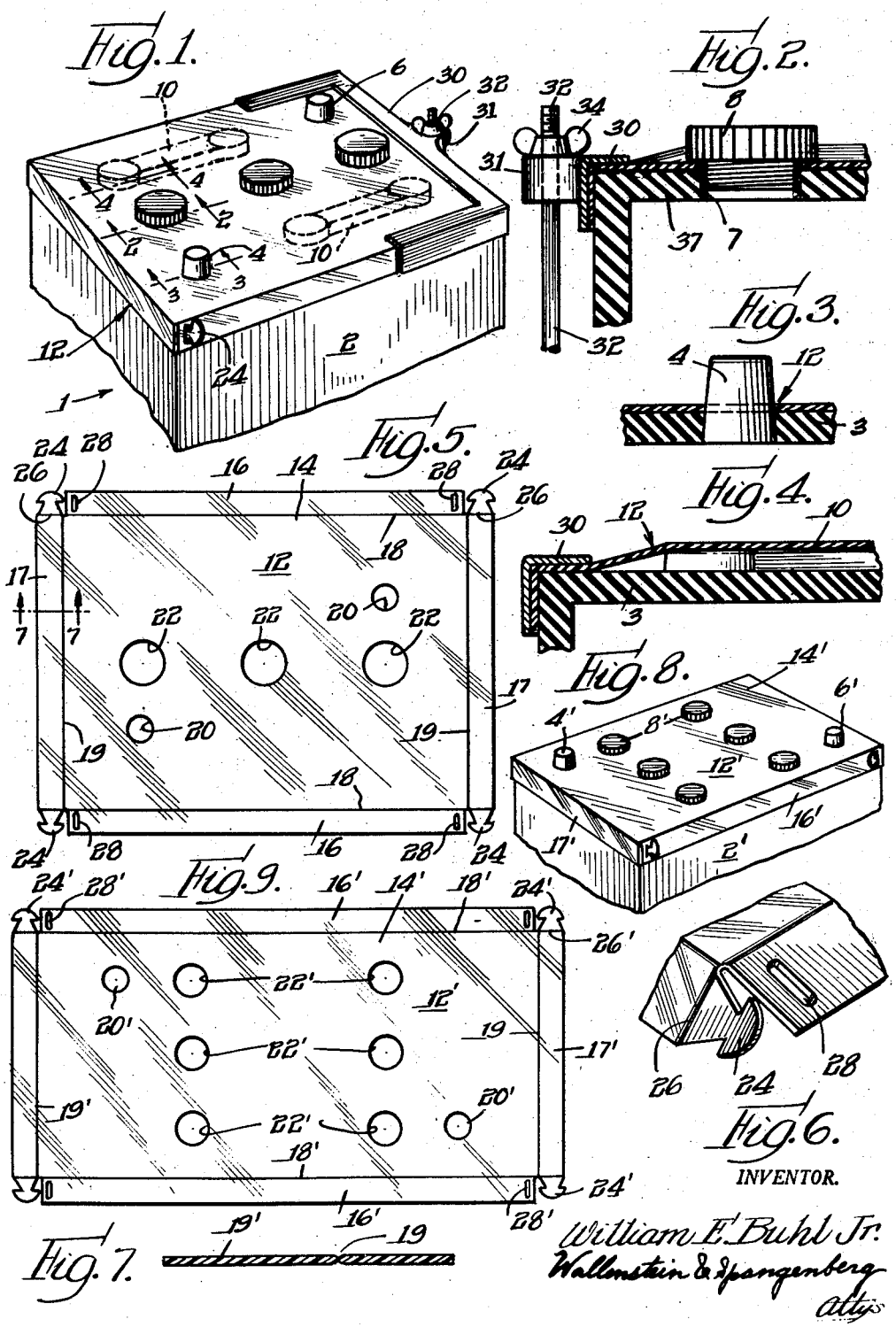

2,956,101
BATTERY COVER
William E. Buhl, Jr., 5018 Balmoral Ave., Chicago, Ill.
Filed June 27, 1956, Ser. No. 594,206
2 Claims. (Cl. 136—181)

This invention relates to wet cell storage batteries of the type commonly used in automobiles, and more particularly to a novel means for prolonging the useful life of such batteries.

The casing top of an automobile wet cell battery has projecting battery terminals and threaded filling openings which are covered by vented plugs which vent to the atmosphere gases generated within the battery. The casing top is conventionally formed of a sealing material which becomes pitted and roughened so that moisture and dust accumulating thereon cannot be readily removed from the battery top by wiping the same with a cloth. The entrapped moisture and dust particles cause battery leakage with consequent loss of voltage and power, battery failure and decrease in the life of the battery. In one case, the voltage measured across two points on the top of a six volt battery spaced from the battery terminals was two and one-half volts. In another example using a twelve volt battery, the voltage measured across two corresponding points was ten volts. This current leakage across the top of the battery was due primarily to moisture and dust particles entrapped within the rough casing top.

The accumulation of dust and moisture particles on the battery top is also undesirable in that electrolysis and corrosion are produced thereby.

Also, in the type of battery having cell connector straps embedded in the sealing material of the casing top, particular difficulty has been encountered in the corroding of the straps due to the leaking down of acid through the battery top onto the embedded connector straps.

It is therefore one of the objects of the present invention to provide means for protecting the top of the battery from the accumulation of dust particles and moisture and the spillage of acid. An ancillary object of the present invention is to provide a means for protecting the battery top from dust particles, moisture and acid which means may be readily applied to the tops of conventional storage batteries and which does not interfere with access to the battery terminals or filling openings on the battery casing. Other objects of the invention are to provide such means as just described which may be readily cleaned of dust particles or moisture, and, further which may be inexpensively manufactured and will last an indefinitely long period of time.

Briefly, in accordance with the present invention, a protective cover is provided which is designed to be mounted upon the battery top in a simple and convenient manner so that practically any person may apply the cover to the battery top without difficulty. This cover has openings therein which are located and sized to surround the battery terminals and filling openings in the battery top. The cover is made of a smooth-surfaced material which may be readily wiped clean of moisture or dust particles. Further, it is made resistant to the acid used in the battery. Such a material is preferably a synthetic plastic material, such as polyethylene.

In the preferred form of the invention, this cover is made from a die-stamped polyethylene sheet. The sheet has a central panel sized to fit the top of a particular shaped six or twelve volt battery with suitable holes provided for surrounding the battery terminals and filling openings of the battery. Extending substantially the entire length of each side of the central panel is a separate, narrow, skirt-forming panel adapted to extend down along the upper extremity of one of the battery sides. At the line of juncture between the central panel of the cover and each skirt-forming panel the material from which the cover is made is weakened as by indenting the material, to form a fold line which enables the skirt-forming panels to be readily folded around the edges of the battery top. Extending from the ends of one pair of opposite skirt-forming panels are tongues which are adapted to be extended through slits formed in the adjacent ends of the other pair of skirt-forming panels. In this way, the latter panels are tied together to form a cover with depending sides. The battery cover is preferably anchored to the storage battery casing by means of the usual hold-down frame which engages the rim portion of the battery casing to hold it in place.

Other objects, advantages and features of the invention will become apparent upon making reference to the specification to follow, the claims and the drawings wherein:

Fig. 1 is a perspective view of the upper half of a six volt wet-cell storage battery fitted with the cover of the present invention;

Fig. 2 is a fragmentary, enlarged vertical section through a portion of the battery top of Fig. 1, taken along section line 2—2;

Fig. 3 is a fragmentary vertical section through another portion of the battery top of Fig. 1, taken along section line 3—3;

Fig. 4 is a fragmentary vertical section through another portion of the battery top of Fig. 1 taken along section line 4—4;

Fig. 5 is a plan view of the die-cut blank from which the battery cover of Fig. 1 is formed;

Fig. 6 is an enlarged perspective view of the corner of the blank of Fig. 5 as the skirt-forming panels thereof are folded into a vertical position where one of the aforementioned tongues may be inserted through a slit in the adjacent skirt-forming panel;

Fig. 7 is a fragmentary enlarged sectional view through a portion of the cover blank of Fig. 5, taken along section line 7—7;

Fig. 8 is a perspective view of a twelve volt battery over which a protective cover has been placed which has been constructed in accordance with the present invention; and Fig. 9 is a plan view of a die-cut blank from which the cover in Fig. 8 has been formed.

Refer now more particularly to the embodiment shown in Figs. 1 through 7. As shown most clearly in Fig. 1, a six volt wet-cell storage battery 1 is shown having the usual casing 2 from the top 3 of which extend tapered, metal battery terminals 4 and 6. The battery top 3, which usually becomes pitted or otherwise roughened with use, has three, internally-threaded filling openings 7 leading to the two volt cells therebeneath. The cells are filled with water and a suitable acid such as sulfuric acid through these filling openings. Threaded into each of these filling openings is a vent plug 8 which has a suitable vent opening therein for enabling release of gases formed in the battery to the atmosphere. In the form of battery shown in Figs. 1 through 4, connecting terminals 10—10 are located above the battery casing top 3. These connecting terminals interconnect opposite terminals of adjacent cells so that the cells are connected in series. However, it should be understood that the present invention is applicable to batteries wherein these connecting terminals are located within the battery.

In accordance with the present invention, the battery top is covered by a protective cover generally indicated by the reference numeral 12. This cover is formed from a blank shown in Fig. 5. The blank, which is preferably formed from a die-cut sheet of polyethylene or similar material which is resistant to the acid of the battery, has a central rectangular panel 14 of the same size as the rectangular top of the battery casing 2 with which it is to be used. A pair of skirt-forming rectangular panels 16—16 extend from opposite sides of the central panel 14 and a pair of generally rectangular, skirt-forming panels 17—17 extend from the other opposite sides of the panel 14. At the lines of conjuncture between the skirt-forming panels and the central panel, the blank is weakened, as by indenting the material during the die-cut operation, to form respective fold lines 18—18 and 19—19.

The central panel 14 has formed therein a pair of diagonally spaced holes 20—20 which are sized and located to fit over the battery terminals 4—6. Located along the central longitudinal axis of the panel 14 are three holes 22—22—22 which are sized and located to fit around the filling openings 7—7—7 in the casing top 3. Extending laterally from the ends of the skirt-forming panels 17—17 are tongues 24 each of which have a neck portion at the base thereof and a head portion at the end thereof. The tongues join the associated panel along a fold line 26 which is formed by weakening the blank material, as by indenting the same. At the ends of the skirt-forming panels 16—16 slits 28 are formed which are adapted to receive the tongues 24.

The skirt-forming panels 17—17 may be bent along the fold lines 18—18 and 19—19 to form depending skirts and these panels may be tied together by passing the tongues 24 through the slits 28. After removing the vent plugs 8, the battery cover may be applied over the top of the battery casing 2. Since polyethylene is a flexible material in thin sheet form, the cover bulges slightly in the vicinity of the connecting terminals 10—10 as shown more clearly in Figs. 2 and 4.

The cover 12 is anchored to the battery cover by means of a hold-down frame 30, which is commonly used to anchor storage batteries in automobiles. This frame has a pair of extensions 31—31 which have holes which receive vertical rods 32—32. A wing nut 34 is threaded around the upper threaded end of each rod 32 to force the hold-down frame downwardly over the rim of the protective cover 12 as shown more clearly in Figs. 1 and 2.

Since the terminals 4—6 extend above the cover 12, and the vent plugs 8 are threaded into the filling opening 7 from above the cover, lead connections may be made to the terminals and the battery may be filled with an acid and water as needed without removing the cover 12 from the battery top. Periodically, the smooth top of the cover may be wiped clean of dirt and moisture by running a rag over the top thereof.

Refer now to Figs. 8 and 9 which show a battery cover of the present invention designed for use with a twelve volt battery now available on the market. This battery, which is generally indicated by the reference numeral 1', has an oblong rectangular casing 2' from the top wall of which extend terminals 4'—6'. Since the battery is a twelve volt battery it has six cells and therefore six filling openings, one above each cell through which acid and water may be poured into the cells. In the battery illustrated, two sets of three cells are alined transversely of the length of the battery. Vent plugs 8' are threaded into the walls around the filling openings in a manner similar to that shown in Fig. 2. In accordance with the invention, a protective cover 12' is applied over the top of the battery casing to protect the battery top from dirt and moisture. This cover is constructed identically to the cover shown in Fig. 5, except for its size and number of openings. Thus, the cover 12' has a central panel 14' of a different size to fit the larger battery 2'. The panel 14' has six openings 22' sized and located to fit around the filling openings in the battery top and suitably sized and located openings 20'—20' sized and located to fit over the battery terminals 4'—6'. Extending from the central panel 14' are skirt-forming panels 16'—16' and 17'—17' which join the panel 14' through fold lines formed by indenting the material out of which the cover is made. The end skirt-forming panels 17'—17' each have tongues 24'—24' adapted to be extended through slits 28'—28' formed in the adjacent ends of the other skirt-forming panels 16'—16'. The modified cover 12' is fitted over and anchored to the battery in the same manner previously described in connection with the embodiment of Figs. 1 through 6.

For each different sized battery on the market, a different battery cover is provided. Due to the construction of the protective cover, the covers may be inexpensively made to reach a mass market. Also, they may be applied to the battery tops in such a simple manner that practically any car owner may apply the covers without difficulty. The battery cover of the invention has materially decreased the likelihood of corrosion of the battery, has materially decreased current leakage, and has increased the available voltage and life of the battery with which it is used.

I claim as my invention:

1. In combination with a wet cell storage battery having a number of cells located within a battery casing in the top of which are upwardly projecting, outermost battery cell terminals and elongated, upwardly projecting connecting terminal means which connect the cells of the battery in series, and removable plugs which extend in to filling openings in the battery top, a removable protective cover over the battery top which cover is made of smooth, flexible, sheet material resistant to the acid used in the battery, said cover including a central panel of a size to cover the top of said storage battery casing and having openings receiving said outermost battery terminals and openings surrounding said filling openings, said central panel covering said connecting terminal means to protect the same from the battery acid, and separate, peripheral, skirt-forming panels from the sides of said central panel, the cover material being weakened along the lines of juncture between said central panel and said peripheral, skirt-forming panels to form fold lines therebetween, enabling ready folding of said panels over the perimeter of the battery top, and complementary interlocking fastening means at the ends of said peripheral panels for joining the same together.

2. In combination with a wet cell storage battery having a number of cells located within a battery casing in the top of which are upwardly projecting, outermost battery cell terminals and elongated, upwardly projecting connecting terminal means which connect the cells of the battery in series, and removable plugs which extend into filling openings in the battery top, a removable protective cover over the battery top which cover is made of smooth, flexible, sheet material resistant to the acid used in the battery, said cover including a central panel of a size to cover the top of said storage battery casing and having openings receiving said outermost battery terminals and openings surrounding said filling openings, said central panel covering said connecting terminal means to protect the same from the battery acid, and separate, peripheral, skirt-forming panels depending from the sides of said central panel.

References Cited in the file of this patent

UNITED STATES PATENTS

| | | |
|---|---|---|
| 273,278 | Hobbs | Mar. 6, 1883 |
| 1,177,547 | Snyder et al. | Mar. 28, 1916 |
| 1,195,217 | Hawthorne et al. | Aug. 22, 1916 |
| 1,424,144 | Kunkel | July 25, 1922 |
| 1,483,091 | Imblum | Feb. 12, 1924 |
| 1,983,507 | Woodbridge | Dec. 4, 1934 |
| 2,629,759 | Brown et al. | Feb. 24, 1953 |
| 2,692,906 | Morgan | Oct. 26, 1954 |
| 2,710,660 | Coleman | June 14, 1955 |

FOREIGN PATENTS

| | | |
|---|---|---|
| 161,804 | Great Britain | Apr. 21, 1921 |